April 2, 1968  J. R. COLE ET AL  3,375,800
SEISMIC CABLE DEPTH CONTROL APPARATUS
Filed April 7, 1967  3 Sheets-Sheet 1

INVENTORS,
JIMMY RAY COLE &
PAUL L. BULLER
BY William J. Miller
ATTORNEY

April 2, 1968    J. R. COLE ET AL    3,375,800
SEISMIC CABLE DEPTH CONTROL APPARATUS
Filed April 7, 1967    3 Sheets-Sheet 2

INVENTORS
JIMMY RAY COLE &
PAUL L. BULLER
BY William J. Miller
ATTORNEY

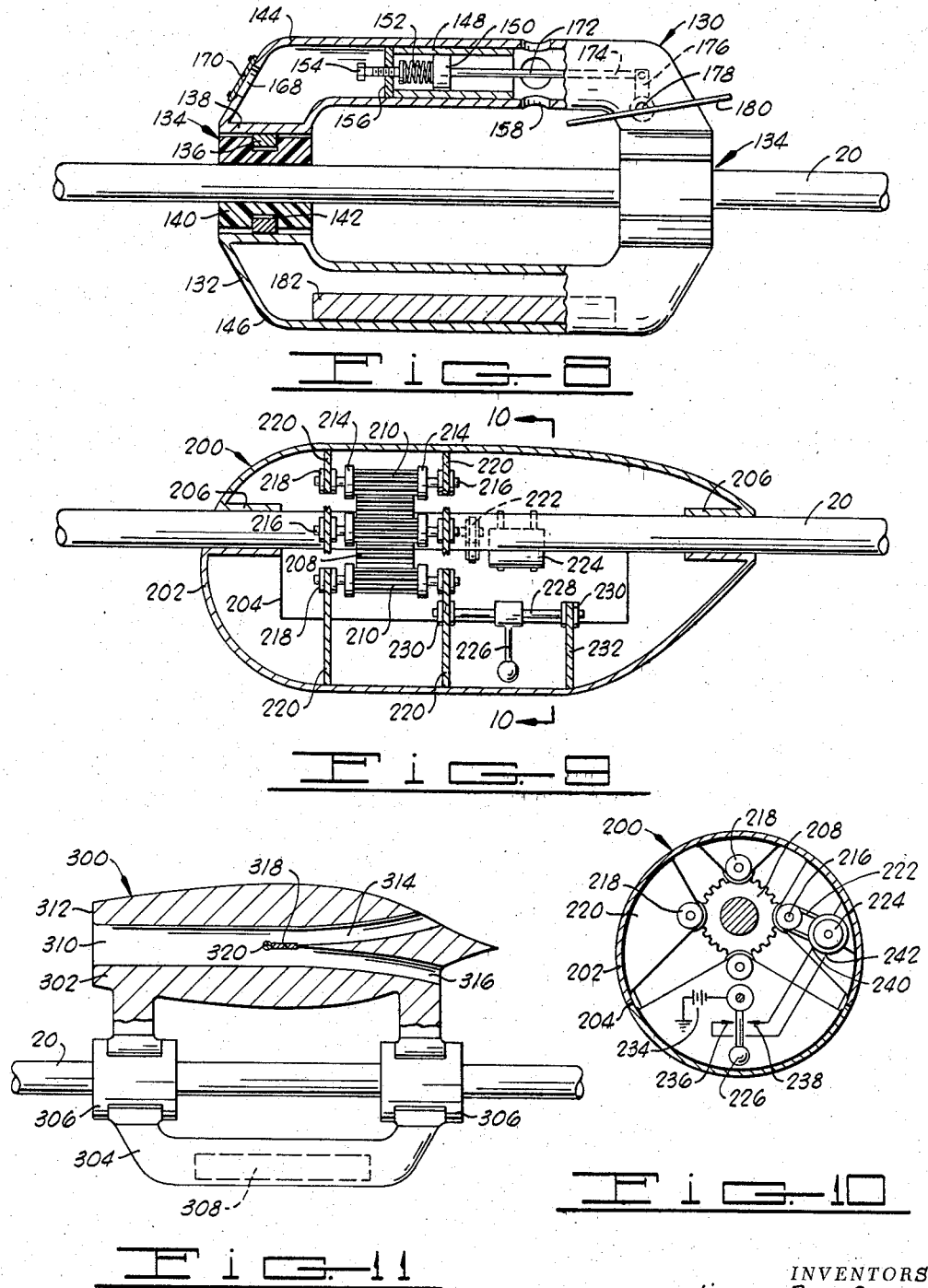

United States Patent Office 3,375,800
Patented Apr. 2, 1968

3,375,800
SEISMIC CABLE DEPTH CONTROL APPARATUS
Jimmy R. Cole, 1800 N. Ash, and Paul L. Buller, 2305 Drake Lane, both of Ponca City, Okla. 74601
Continuation-in-part of application Ser. No. 604,874, Dec. 27, 1966. This application Apr. 7, 1967, Ser. No. 629,276
25 Claims. (Cl. 114—235)

ABSTRACT OF THE DISCLOSURE

A paravane for maintaining a seismic cable being towed through the water at a predetermined depth. The paravane is journaled on the cable and is provided with ballast and stabilizing fins, whereby the paravane will remain oriented vertically and will not spin or turn upon twisting of the cable, as when the direction of movement of the cable is changed by turning of the towing vessel. Diving planes or fins are extended from the opposite sides of the paravane and are controlled by a pressure sensing device mounted in the paravane housing. The pressure sensing device is adjustable such that the diving planes will be turned when the paravane tends to rise or fall in the water above or below a predetermined depth to counteract the forces imposed on the paravane, such that the paravane will maintain the adjacent portion of the cable at the desired predetermined depth.

Cross references to related applications

This is a continuation-in-part of applicants' copending application of the same title filed Dec. 27, 1966, Ser. No. 604,874.

Background of the invention (1) *Field of the invention.*—This invention relates to an improved paravane for maintaining a seismic cable being towed through water at a predetermined depth.

(2) *Description of the prior art.*—The detectors or hydrophones used in marine seismic operations are normally towed through the water by, and form a part of, a seismic detector cable constructed substantially as disclosed in the United States Patent of Leroy C. Paslay, No. 2,465,699, issued Mar. 29, 1949. The problem with such a cable with which this invention is concerned is the maintenance of the cable at a selected, predetermined depth in the water while the cable is being towed by the surveying vessel. It is not unusual for a marine seismic detector cable to be a mile or even two miles long, and the efficiency of the seismic survey is affected to a large degree by the ability to maintain the various detectors or hydrophones along the length of the cable at the same, predetermined depth in the water. As a practical matter, it has been found impossible to control the specific gravity of the cable sufficiently to maintain the entire cable at a predetermined depth.

Probably the most popular technique heretofore used in an effort to maintain the seismic detector cable at a predetermined depth is by using a plurality of weights tied to the cable at spaced intervals to make the cable negatively buoyant. Floats are then also tied to the cable at spaced intervals, the plan being that the floats would ride on the surface of the water and support the cable at the desired depth. However, the floats are flung about by wave action and surveys simply can not be made in rough water. Also, the specific gravity of the water will frequently vary along the length of the cable and the floats will submerge to varying degrees. Further, it has been found that surveys can be conducted when using this technique normally only during daylight hours, primarily because of the navigational hazard provided by the many floats which are normally used. Finally, it is believed that the noise received by the detectors in the cable is generated to a large degree by the buoys, crashing through waves on the surface of the water, such that an increase in the number of buoys merely increases the noise problem.

Various other techniques have been tried for maintaining a seismic detector cable at a predetermined depth in water, but none have proven satisfactory. For example, a boom is sometimes lowered into the water at the stern of the towing vessel to hold the leading end of the detector cable at the desired depth, but the major portion of the cable will vary in depth as the survey is being conducted. The use of a paravane tied to the trailing end of a detector cable and having automatic depth control capabilities has also been disclosed, but such a paravane will be subject to twisting motions of the detector cable and will not effectively maintain even the trailing end of the cable at the desired depth.

Summary of the invention

In its broader aspects, the present invention contemplates a paravane for a seismic cable adapted to be towed through water which includes an elongated housing rotatably secured on the cable such that the cable may twist without turning or spinning the paravane, and yet vertical forces reacting on the paravane will be transmitted to the cable, and vice versa. The paravane includes means for maintaining the paravane at a predetermined depth in the water as the cable and paravane are moved through the water, whereby the paravane maintains the adjacent portion of the cable at the desired, predetermined depth.

In a more limited and preferred form, the present invention contemplates a paravane housing having an axial bore therethrough receiving the seismic cable, and a bearing structure positioned within the axial bore for journaling the paravane around the cable while preventing lengthwise movement of the paravane along the cable. Depth sensing means are carried in the paravane housing and operate diving planes extending from both sides of the housing to automatically control the depth of the paravane and the adjacent portion of the cable.

This invention also contemplates the combination of a seismic detector cable to be towed through the water and a plurality of paravanes journaled on the cable at spaced intervals for maintaining the entire length of the cable at the desired depth in water.

An object of the invention is to maintain a marine seismic detector cable at a predetermined depth in water as the cable is being towed through the water.

Another object of this invention is to reduce the noise received by the detectors in a marine seismic detector cable.

A further object of this invention is to enable marine seismic surveying operations to be conducted at night as well as at day.

Another object of this invention is to provide a paravane for a marine seismic detector cable which will not be affected by twisting of the cable and which will maintain the adjacent portion of the cable at a predetermined depth in water.

Other objects and advantages of the invention will be evident from the following detailed description when read in conjunction with accompanying drawings which illustrate the invention.

Brief description of the drawings

FIG. 8 is a side view, partially in section, of a modified paravane structure mounted on a seismic detector cable.

FIG. 9 is a schematic cross-sectional view of another modified paravane structure mounted on a detector cable.

FIG. 10 is a schematic cross-sectional view taken along lines 10—10 of FIG. 9.

FIG. 11 is a side view, partially in section, of still another modified paravane structure mounted on a seismic detector cable.

*Description of the preferred embodiment*

Figure 1:
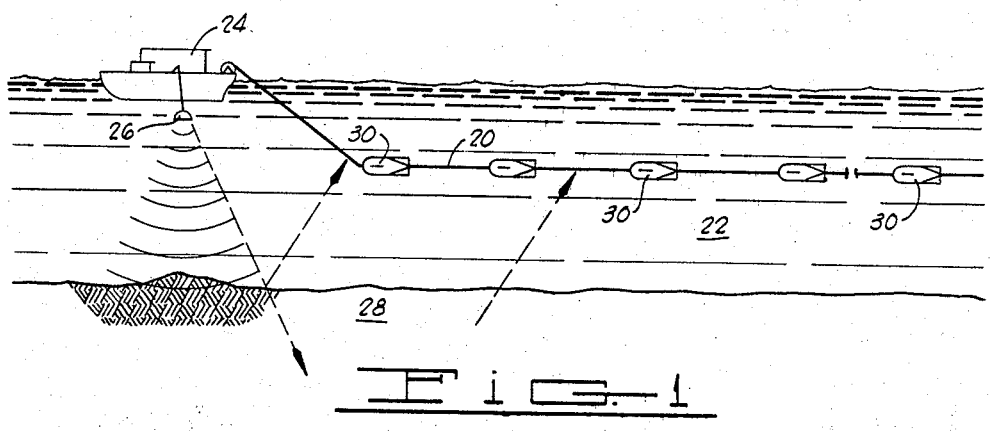
FIG. 1 is a schematic illustration of a seismic surveying system, including a detector cable being maintained at a predetermined depth in a body of water by a plurality of paravanes constructed in accordance with this invention.

Referring to the drawings in detail, and particularly FIG. 1, reference character 20 designates a seismic detector cable being towed through a body of water 22 by a survey vessel 24. The survey vessel 24 also tows a seismic energy source 26 through the water 22. The source 26 either continuously or periodically generates sound waves which enter the subsurface 28 below the water 22 as seismic signals and are reflected back upwardly as indicated by the various arrows. The reflected signals are detected by a plurality of detectors or geophones (not shown) carried in the cable 20 and are converted to electrical signals which are in turn conducted through the cable 20 to suitable recording equipment on the survey vessel 24. In accordance with the present invention, the cable 20 is maintained at a predetermined depth in the water 22 by a plurality of paravanes 30 secured in spaced relation along the length of the cable.

Figure 2:
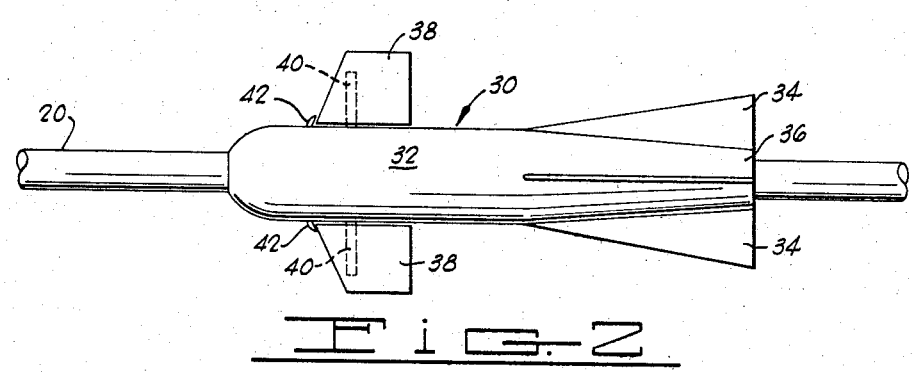
FIG. 2 is a plan view of the preferred paravane structure mounted on said detector cable.

As shown in FIG. 2, each preferred form of paravane 30 comprises an elongated housing 32 having vertical and horizontal, fixed, stabilizing fins 34 secured around the rearward end 36 thereof, and having diving planes or vanes 38 supported by shafts 40 on the opposite sides thereof, as will be more fully set forth below. Also, projections or guards 42 are preferably provided on the opposite sides of the housing 32 immediately forward of the inner edges of the diving planes 38 to minimize the possibility of weeds or the like becoming entangled between the diving planes 38 and outer surface of the housing 32.

Figure 3:
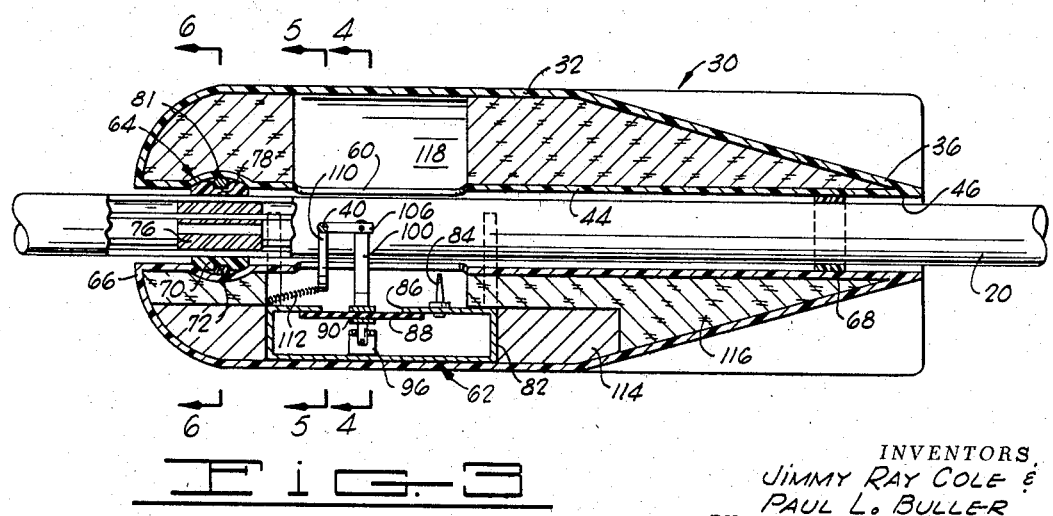
FIG. 3 is a vertical sectional view taken along the longitudinal axis of the preferred paravane structure, with a portion of the detector cable being shown in cross-section.

The housing 32 is substantially hollow and is preferably formed of a light-weight material, such as a material commonly designated as a plastic material. For example, the housing 32 may be molded Teflon or nylon and suitably reinforced if desired. An inner tubular wall 44 (FIG. 3) extends throughout the length of the housing 32 and forms an axial bore 46 extending throughout the length of the housing having a diameter of a size to loosely receive the seismic detector cable 20. Further, and as shown most clearly in FIGS. 4 and 6, the housing 32 is formed in an upper section 48 and a lower section 50 of equal size. That is, the juncture 52 between the upper and lower housing sections 48 and 50 is substantially at the center line of the axial bore 46 extending through the housing, and the exposed surfaces of the housing 32 above and below the center line of the axial bore 46 are of equal area to minimize the tendency of the housing 32 to be turned by cross water currents, as will be set forth more fully below. The upper and lower housing sections 48 and 50 are secured in assembled relation around the cable 20 by a plurality of metal straps 54 suitably secured to the lower housing section 50 and in turn secured at their upper ends to the upper housing section 48 by suitable fasteners 56. The fasteners 56 may be of any desired construction which will enable them to be readily removed for assembly and disassembly of the complete housing 32 around the cable 20. It will also be observed in FIG. 6 that the inner tubular wall 44 of the housing 32 is split at the juncture 52 between the upper and lower housing sections 48 and 50, and the respective halves of the tubular wall 44 are secured to the outer shell of the housing 32 by webs 58. It should further be noted at this point that the tubular wall 44 is cut away throughout a section 60 in the central portion of the housing 32, as shown in FIG. 3, in order that water in the axial bore 46 around the cable 20 will have access to a pressure sensing device generally designed by reference character 62 in FIG. 3. The pressure sensing device 62 will be described in detail below.

The housing 32 is journaled on the cable 20 by a main bearing 64, sometimes referred to as a thrust bearing, adjacent the forward end 66 of the housing 32, and a secondary bearing 68 adjacent the rearward end 36 of the housing. The secondary bearing 68 may merely comprise a split ring of plastic material suitably bonded to the tubular wall 44 to rather loosely surround the cable 20 and simply tend to retain the rearward end 36 of the housing 32 substantially centered around the cable 20.

Figures 6, 7:
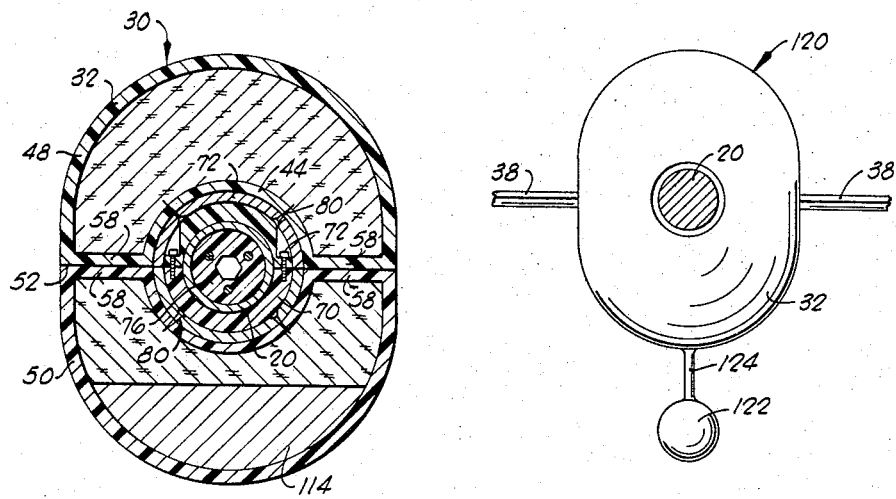
FIG. 6 is a sectional view taken along lines 6—6 of FIG. 3.
FIG. 7 is a schematic end view of a slightly modified paravane structure mounted on a seismic detector cable.

As shown in FIGS. 3 and 6, the main or thrust bearing 64 comprises an inner race 70 and an outer race 72. The inner race 70 is in the form of a split ring having the half sections thereof rigidly secured around the outer surface of the cable 20 by bolts or screws 72. It should also be noted that a reinforcing ring 76 is preferably embedded in the cable 20 inwardly of the race 70 to reinforce the cable at this point and permit the race 70 to be firmly secured to the cable. The inner race 70 is provided with a circumferential groove 78 in the outer surface thereof of a size to loosely receive the outer race 72. The outer race 72 is in the form of a split ring rigidly secured to the adjacent portion of the tubular wall 44 by suitable fasteners 80. In a preferred construction, the inner race 70 is in the form of a light weight metal, such as an aluminum alloy, and the outer race 72 is in the form of a plastic material which may be the same as the material of construction of the housing 32 to provide good cooperating bearing surfaces between the inner and outer races.

As indicated above, the outer race 72 fits loosely in the groove 78 in the inner race 70 to provide complete freedom of turning of the outer race 72 on the inner race 70, and yet prevent any appreciable length-wise movement of the housing 32 on the cable 20. It may also be observed in FIG. 3, that the tubular wall 44 of the housing 32 may be bulged outwardly at 81 around the thrust bearing 64 to accommodate the structure of the bearing if necessary. It should further be noted at this point that both the thrust bearing 64 and the secondary bearing 68 provide sufficent clearance that the pressure of the water in which the paravane 30 is emersed will be transmitted lengthwise through the housing 32 into the cutaway section 60 of the tubular wall 44 during operation of the paravane.

Figures 4, 5:
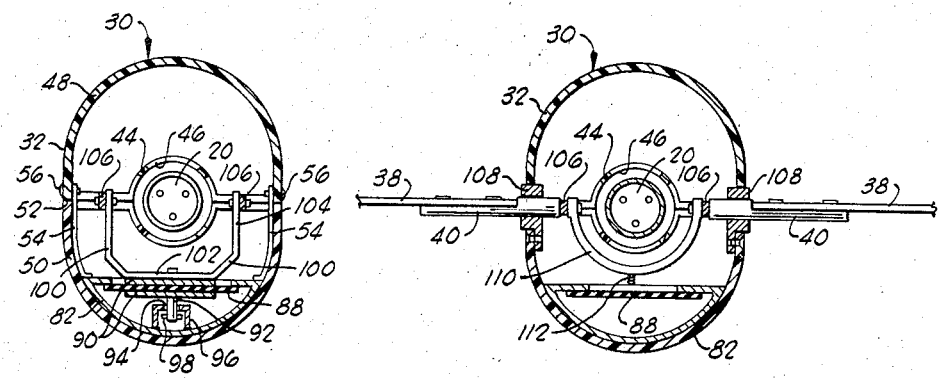
FIG. 4 is a sectional view taken along lines 4—4 of FIG. 3.
FIG. 5 is a sectional view taken along lines 5—5 of FIG. 3.

As shown best in FIGS. 3 and 4, the pressure sensing device 62 comprises a tank or chamber 82 for containing air under pressure, and the air pressure is adjusted by means of a suitable valve 84 which may be, for example, of a construction similar to that used in automotive tubes and tires. An opening 86 is formed in the top of the tank 82 and is covered by an elastic material diaphragm 88. The diaphrgam 88 may be formed of, for example, Neoprene, and the edges thereof are suitably secured in an air-tight relationship with the adjacent portions of the top of the tank 82, as by bonding. Upper and lower reinforcing plates 90 are secured to the top and bottom, respectively, of the central portion of the diaphragm 88 and form what may be considered a piston continually urged upwardly by the air pressure in the tank 82 and constantly urged downwardly by the water pressure in the housing 32. A rod 92 extends downwardly from the reinforcing plates 90 through an aperture 94 in the upper end of a bracket 96. The bracket 96 is rigidly secured to the bottom wall of the tank 82 and a limit pin 98 extends transversely through the lower end of the rod 92 to engage the upper end of the bracket 96 and limit the upward movement of the reinforcing plates 90.

A U-shaped yoke 100 has its lower, closed end 102, rigidly secured to the upper reinforcing plate 90, and the legs 104 of the yoke extend upwardly from the reinforcing plates 90 on opposite sides of the axial bore 46. It will be observed in FIG. 4 that the legs 104 of the yoke 100 are spaced sufficiently apart to not engage the cable 20 when the yoke is moved up and down with the movement of the reinforcing plates 90. The upper end of each of the yoke legs 104 is pinned to an arm 106 which extends substantially horizontally when the reinforcing plates 90 are in their neutral positions as illustrated in FIGS. 3 and 4. The forward end of each arm 106 is rigidly secured to a respective diving plane shaft 40 at the respective side of the housing 32. As shown in FIG. 5, each diving plane shaft 40 is journaled in a suitable bearing 108 in the respective side of the housing 32 with the center lines of the shafts 40 being aligned with the center line of the axial bore 46. Therefore, when the reinforcing plates 90 are moved either up or down, the arms 106 will be pivoted to turn the diving plane shafts 40 equal amounts and in the same directions to adjust the settings of the diving planes 38.

In a preferred structure, a U-shaped brace 110 (see FIG. 5) has its free ends rigidly secured to the diving plane shafts 40 and extends downwardly around the axial bore 46 out of interference with the cable 20. The brace 110 further assures simultaneous and equal movements of the diving planes, as in the event wear may develop in the connection of the yoke 100 to the arms 106. Further, a spring 112 is preferably anchored to the lower end portion of the brace 110 and an adjacent portion of the tank 82 to urge the diving planes 38 in directions for automatically raising the paravane 30 in the event of failure of the diaphragm 88. Also, the spring 112 prevents or minimizes an hysteresis effect in the diaphragm 88 by maintaining the diaphragm 88 in a known position and assures that a given change in the pressure differential across the diaphragm provides a given movement of the piston comprising the reinforcing plates 90. The spring 112 forms no part of the present invention, it being the invention of another, but is included herein to provide a complete disclosure of the best mode known to the present inventors.

Ballast, in the form of a lead weight 114 or the like, is secured in the lower portion of the housing 32 to further assure that the paravane will not turn or spin during movement through the water and that the diving plane shafts 40 will remain extended horizontally.

A suitable floatation material 116 preferably fills the housing 32, except for that portion 118 of the housing around the cutaway portion 60 of the tubular wall 44. The floatation material 116 may be of any desired type which will prevent the housing 32 from being filled with water, and, thus, increase the buoyancy of the paravane. However, the paravane will normally be slightly negatively buoyant.

*Operation of preferred embodiment*

As previously indicated, a plurality of paravanes 30 are used on a cable 20. Thus, before the cable 20 is placed in the water 22, the air pressure in the tank 82 of each paravane to be used is adjusted for the desired running depth of the paravanes and, hence, the desired depth of operation of the cable 20. As previously indicated, this air pressure may be easily adjusted by means of the valve 84 in each paravane. It may also be pointed out that when each tank 82 is pressurized to the desired degree, the diving planes 38 of the respective paravane will be turned into a diving attitude, since the air pressure in the tank will be opposed only by atmospheric pressure on the top of the respective diaphragm 88 and reinforcing plates 90. However, the stop pin 98 connected to the reinforcing plaes in each paravane will prevent the respective diaphragm 88 from being over stressed when the paravane is out of the water.

In use, the paravanes 30 are secured around the cable 20 as the cable 20 is paid out from the survey vessel 24. Each paravane is easily installed around the cable 20 by placing the upper and lower housing sections 48 and 50 around the cable with the outer bearing race 72 fitting in the inner bearing race 70 secured around the cable 20, and then attaching the fasteners 56. In this connection it may be noted that the inner bearing races are normally left intact on the cable 20 when the paravanes 30 are removed, although these inner bearing races can be removed in the event the cable needs repair.

As each paravane 30 is dropped into the water 22 with the cable 20, the diving planes 38 will be in their diving attitudes, such that the paravane will start trying to dive to the predetermined depth as regulated by the pressure in the air tank 82. When each paravane 30 is first placed in the water 22 behind the survey vessel 24, the wake provided by the survey vessel will sometimes make the paravane unstable and the paravane will tend to spin on the cable 20 for a short period of time. However, by virtue of the paravane being journaled on the cable 20, spinning of the paravane for a short period of time does not twist the cable. As soon as the paravane is moved rearwardly out of the wake provided by the survey vessel through a continued paying out of the cable 20, the paravane becomes stable in the water and oriented with diving plane shafts 40 extending horizontally. The diving planes 38 are then effective to urge the paravane downwardly to the predetermined depth of operation.

When the cable 20 has been paid out to the desired length with the paravanes 30 secured thereto, the pressure of the water surrounding each paravane will act on diaphragm 88 and on the upper reinforcing plate 90 and will force the reinforcing plates 90 to a neutral position when the pressure on the opposite sides of the diaphragm 88 becomes equal. At this point, the diving planes 38 will be extended horizontally, providing the diving plane shafts 40 are aligned with the center line of the cable 20 and the center line of the axial bore 46.

In the event a paravane 30 moves below the predetermined depth, as by action of water currents, the hydrostatic pressure of the water will become greater than the pressure in the tank 82; whereupon the reinforcing plates 90 will be moved downwardly and act through the yoke 100 and arms 106 to turn the diving planes 38 to elevating positions. The paravane 30 will therefore be moved upwardly by the reaction of the water 22 on the diving planes 38 until the paravane 30 reaches the desired depth, at which time the diving planes 38 will be returned to neutral positions. Conversely, in the event the paravane 30 moves upwardly above the predetermined operating depth, the pressure in the tank 82 will be greater than the hydrostatic pressure of the water 22 acting on diaphragm 88 and on the upper reinforcing plate 90, and the diving planes 38 will return to diving positions to return the paravane 30 to the desired operating depth.

The diaphragm 88 may be sized to control the operating depth of the paravane 30 to a plus or minus variation which will not affect the efficiency of the seismic survey being conducted. A two foot change in depth of the water 22 provides approximately a one pound per square inch variation in hydrostatic pressure. Thus, the area of the diaphragm 88 exposed to the hydrostatic pressure of the water 22 and to the pressure in the tank 82 will control the operating force available for application to adjust the diving planes 38. In one construction of paravane 30, a diaphragm 88 having an exposed area of seven square inches has been used, and with this size of diaphragm, the paravane will be maintained within plus or minus two feet of the desired operating depth in a surveying operation.

It will be understood that when each paravane 30 is maintained at a predetermined operating depth, the adjacent portion of the cable 20 will likewise be maintained at the desired depth, since any vertical movement of the paravane 30 will be reflected in the adjacent portion of cable 20, and vice versa. On the other hand, any twisting of the cable 20 will not effect the orientation of the paravane 30, since the cable 20 may twist and turn in the axial bore 46 of the paravane and will simply move the inner bearing race 70 with respect to the outer bearing race 72 and not turn the paravane. The paravane 30 will be virtually unaffected by currents, except when the paravane is in the wake of the survey vessel as referred to above, such that the paravane will remain oriented with the diving plane shafts 40 extending horizontally, and the diving planes 38 will effectively control the depth of operation of the paravane.

Since the cable 20 will be maintained at the desired operating depth by the paravane 30, the cable 20 may be maintained out of danger from being cut or damaged by another vessel cutting across astern of the survey vessel 24, and the cable 20 may be left in the water 22 throughout the night, with the seismic surveying operation being continued if desired. Further, since the cable 20 is maintained below surface turbulence, the noise picked up by the detectors in the cable is maintained at a minimum. In fact, in one test, a cable held at a predetermined depth by paravanes 30 experienced a 10:1 signal-to-noise reduction over a similar operation of the cable when the cable was supported by floats from the surface of the water.

*Embodiment of FIG. 7*

A slightly modified paravane structure 120 is schematically illustrated in FIG. 7. The paravane 120 is constructed in the same manner as the paravane 30 previously described, except that the ballast 122 for the paravane 120 is carried below the housing 32 by a web or support 124, rather than being in the housing as in the previous embodiment.

Placing the ballast farther below the cable 20, as in FIG. 7, tends to stabilize the orientation of the paravane which may tend to be upset by twisting of the cable 20, and is therefore desirable under some operating conditions. On the other hand, the exposed surfaces of the paravane 120 are greater below the center line of the cable 20 than above the center line of the cable 20, such that the paravane 20 is more subject to disorientation in response to cross currents than is the paravane structure disclosed in FIGS. 1 through 6.

*Embodiment of FIG. 8*

A still further modified paravane structure 130 is schematically illustrated in FIG. 8. The paravane 130 comprises a generally oval-shaped housing 132 secured symmetrically on the cable 20 by front and rear bearings 134. Each bearing 134 comprises an outer bearing race 136 rigidly secured to the inner surface of a tubular wall 138 of the housing 132, and an inner race 140 rigidly secured around the cable 20. The inner bearing race 140 has a circumferential groove 142 in the outer surface thereof loosely receiving the outer bearing race 136 in a manner similar to that previously described to effectively journal the housing 132 on the cable 20 and yet prevent lengthwise movement of the housing 132 along the cable.

The housing 132 is substantially hollow and includes an upper arm 144 and a lower arm 146. A cylinder 148 is suitably secured in the upper arm 144 in a fixed position and contains a piston 150 slidingly sealed therein. The piston 150 is continually urged in one direction by a spring 152, the compression of which may be adjusted by an adjusting bolt 154 threadedly secured in one end 156 of the cylinder 148. The opposite end of the piston 150 is exposed to the hydrostatic pressure of the water in which the paravane is emersed, since the water communicates with this face of the piston 150 through ports 158 formed in the walls of the arm 144. It may also be pointed out that the setting of the adjusting bolt 154 may be controlled through an opening 168 in the housing arm 144 which is normally covered by a removable plate 170.

A rod 172 projects from the piston 150 and has its free end 174 pinned to an arm 176. The arm 176 is in turn rigidly secured to a shaft 178 which carries diving planes 180 positioned on opposite sides of the housing arm 144.

The lower arm 146 of the housing 132 contains ballast 182 in the form of a lead weight or the like which tends to maintain the housing 132 oriented as shown in FIG. 8 with the diving plane shaft 178 maintained horizontally. It will also be apparent that the housing 132 may be formed in upper and lower sections for ease of assembly and disassembly of the paravane 130 on the cable 20 in a manner similar to that disclosed in FIGS. 1–6.

Before the paravane 130 is placed in water with the cable 20, the spring 152 is adjusted by the bolt 154 for the desired operating depth. Since the force exerted by the spring 152 will be virtually unopposed when the paravane 130 is out of the water, the piston 150 will be moved the maximum extent by the spring 152 to turn the diving planes 180 into a diving attitude when the paravane 130 is first placed in the water. Therefore, the paravane will quickly dive.

As the paravane 30 dives, the hydrostatic pressure imposed on the piston 150 through the ports 158 will increase to move the piston 150 against the spring 152 and gradually decrease the diving attitude of the diving planes 180. When the paravane 30 reaches the desired operating depth, the hydrostatic pressure of the water on the piston 150 will equalize the force provided by the spring 152 to place the piston 150 in what may be considered a neutral position and position the diving planes 180 in positions such that the paravane 130 will remain at said depth.

In the event the depth of operation of the paravane 130 is increased, as by force imposed on the cable 120, the hydrostatic pressure in the water will increase to force the piston in a direction to further compress the spring 152 and adjust the diving planes 180 into positions for raising the paravane. Conversely, in the event the paravane 130 is inadvertently moved upwardly in the water, the hydrostatic pressure will decrease and the spring 152 will move the piston 150 in a direction to place the diving planes 180 into diving positions and thereby lower the paravane back to the desired operating depth.

The bearings 134 prohibit a twisting motion of the cable 20 from being transmitted to spin or turn the housing 132, such that the paravane 130 will remain oriented in the water with the diving plane shaft 178 extending horizontally, and the diving planes 180 will remain in the proper positions for controlling the depth of operation of the paravane. On the other hand, any vertical forces imposed on the cable 20 will tend to raise or lower the paravane 130, and vice versa, such that the paravane 130 will maintain the adjacent portion of the cable 20 at the desired operating depth.

*Embodiment of FIGS. 9 and 10*

A portion of another modified paravane 200 is schematically illustrated in FIGS. 9 and 10. The paravane 200 comprises a hollow housing 202 which may be formed in sections joined along a line 204 for easy placement around the cable 20. The housing 202 is journaled on the cable 20 by bearing portions schematically illustrated at 206 in the forward and rear ends of the housing.

In this embodiment of the invention, a ring gear 208 is rigidly secured around the cable 20 within the housing 202 and is engaged by a plurality of equally circumferentially spaced pinions 210. Each pinion 210 is provided with flanges 214 on the opposite ends thereof of a size to overlap the respective ends of the ring gear 208 and prevent the housing 202 from moving lengthwise along the cable 20. Each pinion 210 is rigidly mounted on a shaft 216 having its opposite ends journaled in bearings 218. Each bearing 218 is in turn held in the desired position in the housing 202 by a plate 220 extending inwardly from the outer walls of the housing in any desired manner. The shaft 216 of one of the pinions 210 is connected by a belt drive 222 to the output shaft of a reversing electric motor 224. The motor 224 is rigidly secured in the housing 202 in any desired manner.

A pendulum 226 is suitably journaled on a shaft 228 supported in a horizontal position in the housing 202 by a pair of bearings 230 and supports 232, such that the pendulum 226 will tend to swing transversely with respect to the cable 20 at any time the angular orientation of the housing 202 is changed. As schematically illustrated in FIG. 10, the pendulum 226 is connected to a source of electrical energy 234, such as a battery. Also, opposed contacts 236 and 238 are positioned on opposite sides of the pendulum 226 and are connected to the forward and reverse inputs 240 and 242, respectively, of the reversing motor 224.

A complete paravane 200 will also include diving planes and a pressure responsive device therein similar to the corresponding structure previously described in connection with FIGURES 1-6, or 8 to control the operating depth of the paravane.

In operation of the paravane 200, the pendulum 226 will remain in a vertical position as long as the housing 202 is properly oriented, that is, as long as the housing 202 is not turned on the cable 20. If the housing 202 starts turning in one direction, the pendulum 226 will contact one of the contacts 236 or 238 to energize the motor 224 in one direction. The motor 224 will in turn drive the pinion 210 connected thereto in a given direction. The respective pinion 210 will in turn engage the ring gear 208 and return the housing 202 to the proper angular orientation. In the event the housing 202 starts turning in the opposite direction the pendulum 226 will contact the opposite contacts 236 or 238 and energize the motor 224 in an opposite direction to return the housing 202 to the desired position through the driving engagement of the pinion 210 connected to the motor 224. The remaining pinions 210 act as idlers and equalize the forces imposed on the ring gear 208.

*Embodiment of FIG. 11*

Still another paravane structure 200 is schematically illustrated in FIG. 11. The paravane 300 comprises an upper housing section 302 and a lower housing section 304 interconnected by forward and rear tubular portions 306. The tubular portions 306 are journaled around the cable 20, as by bearings 134 of the type shown in FIG. 8. The lower housing section 304 contains a suitable ballast 308 which will retain the lower housing section 304 extending downwardly below the cable 20 and will retain the upper housing section 302 extending upwardly above the cable 20.

The upper housing section 302 contains walls forming an inlet passageway 310 communicating with the forward end 312 of the housing; a rearwardly and upwardly extending passageway 314 communicating with the passageway 310 and the outer surface of the housing section 302; and a downwardly and rearwardly extending passageway 316 communicating with the inlet passageway 310 and the outer surface of the housing section 302. A vane 318 is rotatably secured in the housing section 302 by a shaft 320 in a position to selectively at least partially close off the passageways 314 and 316 from the inlet passageway 310. In other words, referring to FIG. 11, when the vane 318 is turned counterclockwise, the passageway 314 will be at least partially closed off, and when the vane 318 is turned clockwise, the passageway 316 will at least be partially closed from the inlet passageway 310. The shaft 320 is suitably connected to a pressure sensing device of the type shown in either FIG. 3 or FIG. 8, such that the vane 318 will be turned by variations in the hydrostatic pressure of the water in which the paravane 300 is operating.

In operation of the paravane 300, the pressure sensing device will turn the shaft 320 to turn the vane 318 into a position partially closing off the passageway 316 from the inlet 310 when the paravane 300 is first placed in the water. Thus, as the paravane 300 is towed through the water, the water flowing through the inlet passageway 310 and then upwardly and rearwardly through the passageway 314 will cause a reaction on the paravane to make the paravane dive toward the predetermined depth of operation. When the predetermined depth is reached, the vane 318 will have been moved to a neutral position as illustrated in FIG. 11. In the event the paravane 300 is lowered from the desired operating depth, the vane 318 will be turned by the pressure sensing device to partially close off the passageway 314 from the inlet passageway 310. The water then flowing through the inlet passageway 310 will be directed downwardly by the passageway 316 and cause a reaction force for raising the paravane 300 back to the desired operating depth.

From the foregoing it will be apparent that the present invention will effectively maintain a marine seismic detector cable at a predetermined depth in water as the cable is being towed through the water. The noise received by the detectors in the cable will be substantially reduced over previous operating techniques and the cable may be left in the water during the night and, in fact, the seismic surveying operations may be continued throughout the night if desired. The paravane provided by this invention will not be affected by twisting of the cable, as when the direction of the surveying vessel is changed, such that the means for controlling the depth of the paravane will remain oriented in the proper position and remain effective for controlling the depth, even as the cable is turned.

Changes may be made in the combination or arrangement of parts or elements as heretofore set forth in the specification and shown in the drawings, it being understood that changes may be made in the embodiments disclosed without departing from the spirit and scope of the invention as defined in the following claims.

What is claimed is:

1. A paravane for a seismic cable adapted to be towed substantially horizontally through water, comprising: a housing having a bore means along its length thereof, said bore means of a size to receive said seismic cable and allow rotation of said seismic cable without rotation of said housing while transmitting upward and downward forces between the housing and the adjacent portions of said cable; bearing means for securing the housing onto said seismic cable against movement of said housing along said cable; and means carried by the housing including at least one vane for maintaining the paravane at a predetermined depth in the water as the paravane is moved through the water by the cable and for counteracting upward, downward and turning forces imposed on the housing, whereby the paravane maintains the adjacent portions of the said seismic cable at said predetermined depth.

2. A paravane as defined in claim 1 wherein said last mentioned means includes:

ballast carried by the housing below the cable to counteract turning forces imposed on the housing;

depth sensing means carried by the housing; and adjustable diving means carried by the housing, engaging the water and connected to the depth sensing means for varying the depth of the paravane in response to the depth sensing means.

3. A paravane as defined in claim 2 characterized further to include:

vertical and horizontal fixed fins secured to the exterior of the housing for further counteracting turning forces imposed on the housing.

4. A paravane as defined in claim 2 wherein said adjustable diving means comprises:

diving planes rotatably secured to the opposite sides of the housing; and means interconnecting the diving planes for uniform adjustment of the diving planes in response to the depth sensing means.

5. A paravane as defined in claim 2 wherein said housing has a forward end and a rearward end, wherein said adjustable diving means comprises:

walls in the housing forming an inlet passageway for water at the forward end of the housing, a rearward and upwardly extending passageway communicating with the inlet passageway and the exterior of the housing, and a rearward and downwardly extending passageway communicating with the inlet passageway and the exterior of the housing; and said vane connected to the depth sensing means and pivotally secured in the housing in a position to selectively at least partially close off said upwardly and downwardly extending passageways to control the flow of water therethrough as the housing is moved through the water.

6. A paravane for a seismic cable adapted to be towed through water, comprising:

an elongated housing having an upper portion, a lower portion, a forward end and a rearward end, and having an axial bore extending therethrough of a size to receive the cable;

bearing means rotatably securing the housing on the cable while preventing lengthwise movement of the housing along the cable;

stabilizing means carried by the housing to prevent the housing from rotating while being towed through the water by the cable; and depth control means carried by the housing for maintaining the housing, and hence the adjacent portion of the cable, at a predetermined depth in the water as the cable and housing are towed through the water.

7. A paravane as defined in claim 6 wherein said housing comprises an upper section, a lower section, and fasteners securing the upper and lower sections around the cable.

8. A paravane as defined in claim 6 wherein said bearing means comprises:

an inner race rigidly secured around the cable; and
an outer race journaled on the inner race and rigidly secured to the housing within said axial bore.

9. A paravane as defined in claim 8 wherein said inner race is secured in said axial bore adjacent the forward end of the housing.

10. A paravane as defined in claim 8 wherein said inner race comprises a ring having a circumferential groove in the outer periphery thereof; and said outer race comprises a ring of a material different from the inner race ring and sized to slidably fit in said circumferential groove.

11. A paravane as defined in claim 10 wherein said housing comprises an upper section and a lower section and fasteners for securing said sections around the cable, and wherein said outer race ring is formed in the two sections, one section being secured to the upper housing section and the other section being secured to the lower housing section.

12. A paravane as defined in claim 6 wherein said stabilizing means includes ballast carried by the lower portion of the housing below the cable.

13. A paravane as defined in claim 12 wherein the ballast is secured in the lower portion of the housing and wherein the area of the surfaces of the housing below the center line of said bore exposed to the water are equal to the area of the surfaces of the housing above the center line of said bore exposed to the water.

14. A paravane as defined in claim 13 characterized further to include fixed vertical and horizontal fins secured to the outer surface of the housing.

15. A paravane as defined in claim 12 wherein said ballast is positioned below the housing.

16. A paravane as defined in claim 6 wherein said depth control means includes:

horizontally extending shafts journaled in the opposite sides of the housing;

a diving plane rigidly secured on each shaft; a piston reciprocally carried by the housing having one end thereof exposed to the water through which the paravane is towed;

adjustable elastic means engaging the piston whereby the piston will move in response to changes in depth of the paravane above and below a predetermined depth; and a linkage connecting the piston to said shafts for turning said shafts and controlling the settings of the diving planes.

17. A paravane as defined in claim 16 wherein said piston is supported in the housing for vertical movement with said one end thereof exposed to said axial bore, and wherein the diameter of said axial bore is larger than the diameter of the cable, whereby the water through which the paravane is moving contacts said one end of the piston.

18. A paravane as defined in claim 16 wherein said shafts are aligned with the center line of said axial bore, and wherein said linkage includes a U-shaped yoke having its free ends extending upwardly and being sized to move vertically without interference with the cable;

means connecting the closed end of the yoke to the piston for vertical movement of the yoke with the piston; and an arm pivotably secured to each of the free ends of the yoke and rigidly secured to the shaft on the respective side of the cable for turning the shafts upon movement of the piston.

19. A paravane as defined in claim 18 characterized further to include a semi-circular shaped brace loosely encircling one-half of the cable and having its ends rigidly secured to the shafts to assure equal movement of the diving planes.

20. A paravane as defined in claim 6 wherein said housing is hollow and characterized further to include:

floatation material filling the available space in the housing not required for said bearing means, stabilizing means and depth control means.

21. A paravane as defined in claim 9 wherein a secondary bearing is secured in the axial bore loosely around the cable adjacent the rearward end of the housing.

22. Apparatus for maintaining a seismic cable at a predetermined depth as the cable is being towed substantially horizontally through water, comprising:

a plurality of paravanes secured in spaced relation along the cable, each of said paravanes comprising:

a housing having a bore means along its length thereof, said bore means of a size to receive said seismic cable and allow rotation of said cable without rotation of said housing while transmitting upward and downward forces between said housing and adjacent portions of said cable; bearing means for securing said housing onto said cable against movement of said housing along said cable; and means carried by the housing including at least a vane for maintaining the paravane at a predetermined depth in the water as the paravane is moved through the water by the cable and for counteracting upward, downward and turning forces imposed on the housing, whereby the paravane maintains the adjacent portion of the cable at said predetermined depth.

23. Apparatus for maintaining a seismic cable at a predetermined depth as the cable is being towed through water, comprising:
a plurality of paravanes secured in spaced relation along the cable, each of said paravanes comprising:
an elongated housing having an axial bore extending therethrough of a size to receive the cable;
bearing means rotatably securing the housing on the cable while preventing lengthwise movement of the housing along the cable;
stabilizing means carried by the housing to prevent the housing from rotating while being towed through the water by the cable; and
depth control means carried by the housing for maintaining the housing, and hence the adjacent portion of the cable, at a predetermined depth in the water as the cable and housing are towed through the water.

24. A paravane for a seismic cable adapted to be towed through water, comprising:
an elongated housing having an axial bore therethrough of a size to receive the cable;
a ring gear rigidly secured around the cable;
at least one pinion journaled in the housing in a position to engage the ring gear and turn the housing around the cable;
reversing motor means in the housing drivingly connected to said pinion;
a source of electrical energy;
a pendulum secured in the housing for swinging when the housing turns on the cable and being connected to the source of electrical energy;
contacts in the housing on the opposite sides of and positioned to be selectively engaged by the pendulum upon turning of the housing on the cable, said contacts being connected to the forward and reverse inputs of the reversing motor for maintaining the housing in a predetermined angular orinetation upon twisting of the cable; and
depth control means carried by the housing for maintaining the housing, and hence the adjacent portion of the cable, at a predetermined depth in the water as the cable and housing are towed through the water.

25. A paravane for an elongated member adapted to be towed substantially horizontally through water, comprising; a housing having a bore means along its length thereof, said bore means of a size to receive said elongated member and allow rotation of said elongated member without rotation of said housing while transmitting upward and downward forces between the housing and the adjacent portions of said elongated member; bearing means for securing the housing onto said elongated member against movement of the housing along said elongated member; and, means carried by the housing including at least a vane for maintaining the paravane at a predetermined depth in the water as the paravane is moved through the water by said member and for counteracting upward, downward and turning forces imposed on the housing, whereby the paravane maintains the adjacent portion of said member at said predetermined depth.

References Cited

UNITED STATES PATENTS

| | | |
|---|---|---|
| 2,607,842 | 8/1952 | Reid. |
| 2,729,200 | 1/1956 | Paslay et al. |
| 2,610,240 | 9/1952 | Pottorf _____ 114—235 X |
| 3,224,406 | 12/1965 | Clark. |
| 3,332,058 | 7/1967 | Loper et al. |

FERGUS S. MIDDLETON, *Primary Examiner.*

MILTON BUCHLER, *Examiner.*

T. M. BLIX, *Assistant Examiner.*